US010694358B2

(12) United States Patent
Savolainen et al.

(10) Patent No.: US 10,694,358 B2
(45) Date of Patent: Jun. 23, 2020

(54) SESSION CONTINUITY FOR IPV6 OVER BLUETOOTH LOW ENERGY

(71) Applicant: Nokia Technologies Oy, Espoo (FI)

(72) Inventors: Teemu Ilmari Savolainen, Nokia (FI); Juha Johannes Salokannel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 55 days.

(21) Appl. No.: 15/567,543

(22) PCT Filed: Apr. 29, 2015

(86) PCT No.: PCT/US2015/028262
§ 371 (c)(1),
(2) Date: Oct. 18, 2017

(87) PCT Pub. No.: WO2016/175794
PCT Pub. Date: Nov. 3, 2016

(65) Prior Publication Data
US 2018/0124551 A1 May 3, 2018

(51) Int. Cl.
*H04W 4/80* (2018.01)
*H04W 36/00* (2009.01)
(Continued)

(52) U.S. Cl.
CPC ............. *H04W 4/80* (2018.02); *H04W 4/70* (2018.02); *H04W 36/0033* (2013.01);
(Continued)

(58) Field of Classification Search
CPC ......... H04W 4/80; H04W 4/70; H04W 76/10; H04W 36/0033; H04W 80/04;
(Continued)

(56) References Cited

U.S. PATENT DOCUMENTS

| 2009/0279452 A1* | 11/2009 | Akiyoshi | H04W 36/0011 370/254 |
|---|---|---|---|
| 2012/0287932 A1* | 11/2012 | Haddad | H04L 61/6072 370/392 |
| 2015/0023339 A1 | 1/2015 | Erickson et al. | |

FOREIGN PATENT DOCUMENTS

| EP | 2238732 A1 | 10/2010 |
|---|---|---|
| WO | 2009/095089 A1 | 8/2009 |

OTHER PUBLICATIONS

Shelby et al., "Neighbor Discovery Optimization for IPv6 Over Low-Power Wireless Personal Area Networks 6LoWPANs)", RFC 6775, Internet Engineering Task Force, Nov. 2012, pp. 1-55. (Year: 2012).*

(Continued)

*Primary Examiner* — Edward F Urban
*Assistant Examiner* — Angelica M Perez
(74) *Attorney, Agent, or Firm* — Mintz Levin Cohn Ferris Glovsky and Popeo, P.C.

(57) ABSTRACT

Methods and apparatus, including computer program products, are provided for communications. In one aspect there is provided a method. The method may include sending, by a low power node, an indicator to a target low power router, wherein the indicator at least represents a request to operate with a prior context used at a source low power router; and receiving, by the low power node, a message in response to the indicator, wherein the message at least indicates whether the low power node can operate at the target low power router with a same context that corresponds to the prior context used previously at the source low power router. Related apparatus, systems, methods, and articles are also described.

18 Claims, 5 Drawing Sheets

(51) Int. Cl.
*H04W 4/70* (2018.01)
*H04W 76/10* (2018.01)
*H04W 84/18* (2009.01)
*H04W 80/04* (2009.01)

(52) U.S. Cl.
CPC ............ *H04W 76/10* (2018.02); *H04W 80/04* (2013.01); *H04W 84/18* (2013.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/22* (2018.01)

(58) Field of Classification Search
CPC ............... H04W 84/18; Y02D 70/1264; Y02D 70/1224; Y02D 70/142; Y02D 70/146; Y02D 70/22; Y02D 70/1262; Y02D 70/144; Y02D 70/1242; Y02D 70/162
See application file for complete search history.

(56) References Cited

OTHER PUBLICATIONS

Nieminen et al., "Transmission of IPv6 Packets Over Bluetooth(R) Low Energy draft-ietf-6lo-btle-07", 6Lo Working Group, Jan. 16, 2015, pp. 1-21. (Year: 2015).*
Shelby et al., "Neighbor Discovery Optimization for IPv6 Over Low-Power Wireless Personal Area Networks (6LoWPANs)", RFC 6775, Internet Engineering Task Force, Nov. 2012, pp. 1-55.
"Internet Protocol Support Profile", Bluetooth Specification, V1.0.0, Dec. 16, 2014, pp. 1-14.
Nieminen et al., "Transmission of IPv6 Packets Over Bluetooth(R) Low Energy draft-ieff-6lo-btle-07", 6Lo Working Group, Jan. 16, 2015, pp. 1-21.
Krishnan et al., "Simple Procedures for Detecting Network Attachment in IPv6", RFC 6059, Internet Engineering Task Force (IETF), Nov. 2010, pp. 1-19.
Gundavelli et al., "Proxy Mobile IPv6", RFC 5213, Network Working Group, Aug. 2008, pp. 1-92.
Yokota et al., "Fast Handovers for Proxy Mobile IPv6", RFC 5949, Internet Engineering Task Force, Sep. 2010, pp. 1-32.
Paakkonen et al., "Ipv6 Prefix Delegation-Based Addressing Solution for a Mobile Personal Area Network", 23rd International Conference on Distributed Computing Systems Workshops, May 19-22, 2003, 6 pages.
Khan et al., "Sensor Fast Proxy Mobile Ipv6 (SFPMIPv6)—A Framework for Mobility Supported IP-WSN for Improving QoS and Building IoT", International Conference on Communications and Signal Processing (ICCSP), Apr. 3-5, 2014, pp. 1593-1598.
Kempf, "Problem Statement for Network-Based Localized Mobility Management (NETLMM)", RFC 4830, Network Working Group, Apr. 2007, pp. 1-13.
Hui et al., "Compression Format for IPv6 Datagrams over IEEE 802.15.4-Based Networks", RFC 6282, Internet Engineering Task Force, Sep. 2011, pp. 1-24.
Nieminen et al., "IPv6 over Bluetooth(R) Low EnergyDraft-Ietf-6lo-Btle-11", 6Lo Working Group, Apr. 27, 2015, pp. 1-18.
"Bluetooth Specification V4.1", Specification of the Bluetooth system, Dec. 3, 2013, 2684 pages.
International Search Report and Written Opinion received for corresponding Patent Cooperation Treaty Application No. PCT/US2015/028262, dated Jan. 27, 2016, 13 pages.

* cited by examiner

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |     Type~305  |  Length = 1   |R|  Res  |     Lifetime~330    |
   +-+-+-+-+-+-+-+-+-+-+-+-+-+-+-+-+-+-+-+-+-+-+-+-+-+-+-+-+-+-+-+-+
   |                         MCID value ~340                        |
   +-+-+-+-+-+-+-+-+-+-+-+-+-+-+-+-+-+-+-+-+-+-+-+-+-+-+-+-+-+-+-+-+
```
(315, 320 label the R and Res fields; 310 labels Length)

FIG. 3

SESSION CONTINUITY FOR IPV6 OVER BLUETOOTH LOW ENERGY

RELATED APPLICATION

This application was originally filed as Patent Cooperation Treaty Application No. PCT/US2015/028262 filed Apr. 29, 2015.

FIELD

The subject matter described herein relates to wireless communications.

BACKGROUND

The Internet of Things (IoT), machine-based communication networks, and other low power networks are increasingly being deployed. These low power networks may be able to support IoT and other devices having limited power, limited data rate, and/or limited overall capabilities.

SUMMARY

Methods and apparatus, including computer program products, are provided for session continuity.

In some example embodiments, there is provided a method that includes sending, by a low power node, an indicator to a target low power router, wherein the indicator at least represents a request to operate with a prior context used at a source low power router; and receiving, by the low power node, a message in response to the indicator, wherein the message at least indicates whether the low power node can operate at the target low power router with a same context that corresponds to the prior context used previously at the source low power router.

In some variations, one or more of the features disclosed herein including the following features can optionally be included in any feasible combination. The low power node may establish a connection using the same context to the target low power router, when the message indicates the same context can be used. The low power node may establish a connection using a different context to the target low power router, when the message indicates the same context cannot be used. The same context may include a short address, a local network address, an identifier, a hash value, or a combination thereof. The same context may include at least one of an internet protocol version six address of a link used by the low power node when connected to the source low power router. The same context may include an internet protocol version six address of a link used by the low power node when connected to the source low power router. The same context may include at least one of a Bluetooth channel identifier or a Bluetooth low energy address of a link used by the low power node when connected to the source low power router. The low power node, the target low power router, and the source low power router may be configured to at least operate in accordance with an internet protocol version six address and Bluetooth low energy. The low power node may include an internet protocol version six address LowPAN node. The target low power router and the source low power border may each include at least one of an internet protocol version six address border router or an internet protocol version six address router. The target low power router and the source low power router may be the same node. The target low power router and the source low power router may operate in a Bluetooth mesh network. The sent indicator may be carried by at least one of an internet protocol version six address message or a Bluetooth message.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 3 depicts an example format for a mobility context identifier enabling a device's context or state to move as the device moves, in accordance with some exemplary embodiments;

Figure 1:
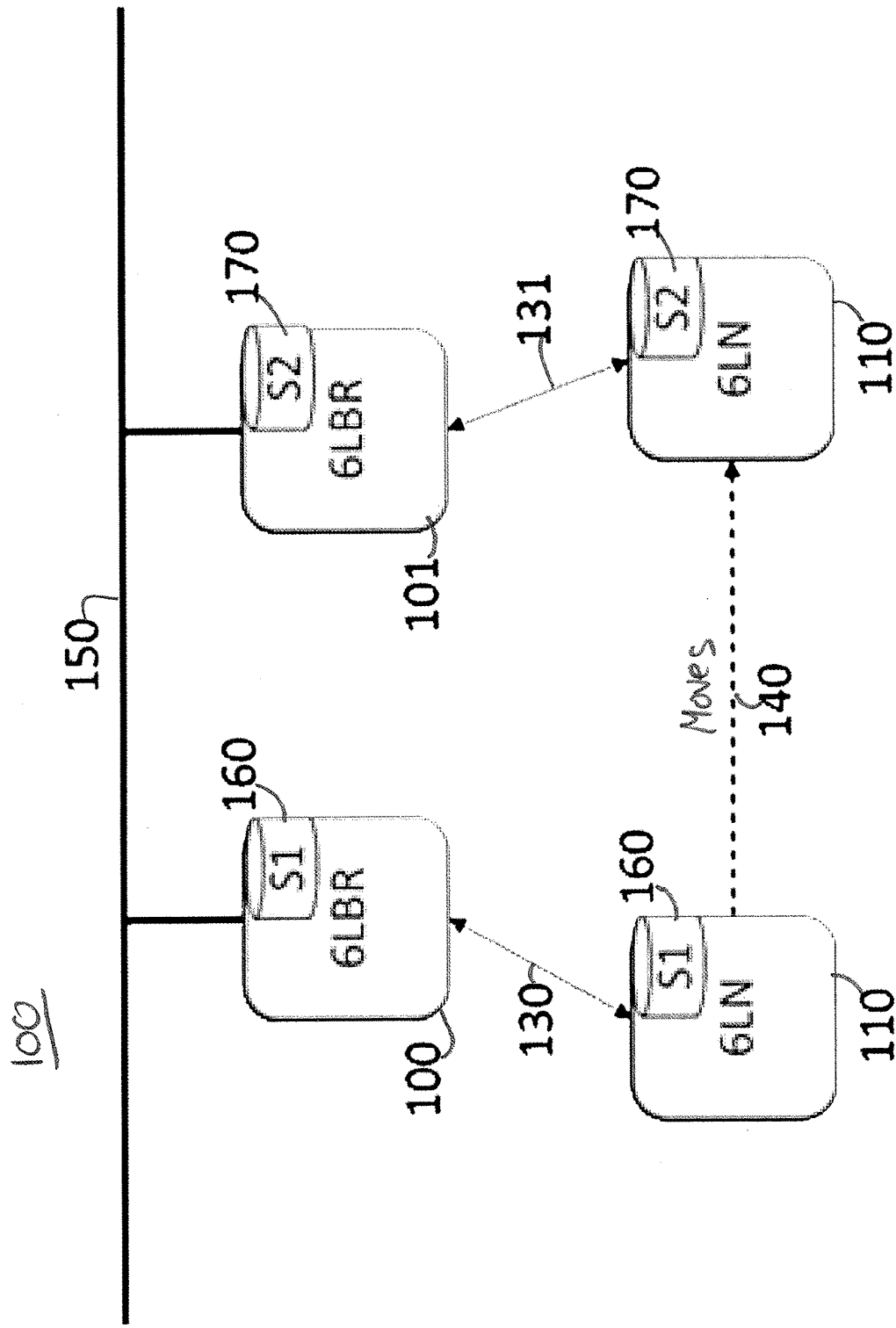
FIG. 1 depict an example of a system including nodes operating over a low power network, in accordance with some exemplary embodiments.

Like labels are used to refer to same or similar items in the drawings.

DETAILED DESCRIPTION

Many devices including Internet of Things (IoT) devices are operating using low power radio technologies, such as Bluetooth, Bluetooth Low Energy (BLE), and/or other radio technologies. In addition, these devices may also be configured to transmit and/or receive data using additional protocols, such as Internet Protocol version 6 (IPv6) and/or the like.

To enable devices to operate over lower power wireless networks, IPv6 over Low power Wireless Personal Area Networks (6LoWPAN) may be one of the technologies being considered for deployment in low power wireless networks including IoT as well as other devices. 6LowPAN includes features such as encapsulation and header compression, packet size adaptation between networks, address resolution, and the like (see, for example, IEEE 802.15.4 and RFC 6282). In the case of IPv6 over BLE for example, some current standards provide guidance with respect to connection setup in a stationary setting, but these current standards may be ill suited for mobility. To illustrate using the 6Lo Working Group Internet-Draft standard, if a IPv6 low power node such as a IPv6 LowPAN node (6LN) moves and losses its Bluetooth connection (which may be via logical link control and adaptation protocol (L2CAP)) to another node such as an IPv6 LoWPAN border router (6LBR), the IPv6 connection may also be terminated or lost, in which case application level connections may also be terminated. See, e.g., IPv6 over Bluetooth Low Energy, 6Lo Working Group, Apr. 27, 2015 (herein referred to as the 6Lo Working Group Internet-Draft standard). Accordingly, when the 6LN re-establishes another BLE connection (to the same or another 6LBR), the 6LN may connect to the 6LBR and then re-establish the IPv6 connection. The 6LBR may also be part of mesh network, and hence reconnecting to another 6LBR may cause 6LN to change its point of attachment in the mesh network. However, because some, if not all, of the sessions at the IPv6 layer or above were, as noted, disconnected or terminated, these sessions would also need to be re-established.

However, in the case of IoT-type devices (as well as other low power radio nodes for example), a node, such as a 6LN or the like, may be limited with respect to power, memory, and/or processing capacity, so these low power nodes may be limited with respect to using certain types of IP protocols that are inefficient in terms of power, memory, and/or processing. Moreover, the header compression and IPv6 address registration features provided by 6LoWPAN technologies may also pose a challenge with respect to mobility as both the 6LN and the 6LBR maintain/contain state information for the 6LN's IPv6 address registrations. For example, a 6LN may register its addresses (for example, address currently being used by the 6LN) with the 6BLR (see, for example, section 3.2.2 of https://tools.ietf.org/id/draft-ietf-6lo-btle-07.txt and section 4.1 of RFC 6775). But re-establishing an address registration state may also require some form of signaling, which consumes power and/or the like even before application level communications take place. The aforementioned may thus present at least two challenges. First, how to provide session continuity, such as TCP/IP session continuity and/or the like, for low power wireless technology in a mobile environment in which for example IPv6 enabled BLE nodes are moving. Second, how to minimize the signaling required for re-establishing states after node movement.

To illustrate the challenges, FIG. 1 depicts an example of a system 100. In the example shown, a first node, such as 6LN 110, may be coupled to another node, such as 6LBR 100. This coupling may be over a wireless link 130, such as over Bluetooth, BLE, and/or other type of low power or short-range radio access technology. The link 130 may enable the 6LN 110 to share (for example, register and/or the like) state information S1 160 with 6LBR 100. The state information may include the address(es) being used by 6LN.

FIG. 1 also shows that 6LBR 100 is coupled to a network 150, such a cellular network, the Internet, a wireless local area network, and/or any other type of communication medium.

When 6LN 110 moves (as indicated by arrow 140), some current specifications as noted above may not retain state information 160. As such, when 6LN 110 re-establishes another BLE connection 131 with the same 6LBR 100 or another 6LBR 101, a new context state S2 170 may need to be established. The re-establishment of this new context state S2 may require signaling, which as noted above consumes power (which is undesirable for low energy devices such as IoT devices). This re-establishment may also cause some, if not all, of the IP layer and above sessions (which were active while 6LN node 110 was coupled to 6LBR 100) to be lost and require re-establishment (which is also undesirable for low energy devices such as IoT devices). As such, the mobility of the 6LN node 110 may cause a disconnection at 130 and/or network 150 and a loss of state information including context information, such whether the IP address being used by 6LN 110 before the move 140 is still available for use after the move 140 to 6LBR 101.

In some example embodiments, there is provided an indicator. In some example embodiments, the indicator may comprise a unique (at least locally) mobility context identifier (MCID). In some example embodiments, the MCID may be used by nodes, such as the 6LBR and 6LN, to share (for example, request, provide, send, receive, exchange, and/or the like) state information. This state information may correspond to the address(es) being used by the node, such as the 6LN. Moreover, the state information may correspond to the registered address (es) being used by the 6LN 110 over the wireless link, such as the BLE link. In this way, after a disconnection due to for example mobility, the nodes may determine whether the state or context associated with that MCID is still available for use by the 6LN during a re-establishment of the connection to the same or other device/router, such as a 6LBR node and/or another type of node.

In some example embodiments, when a wireless link such as BLE connection 130 is lost (for example, due to mobility), the nodes, such as 6LN 110 and 6LBR 100, may retain the state (for example, address(es) from a prior session and the like) they had before the connection loss. Moreover, the state may be retained via the MCID, and may be retained for a certain period of time, in accordance with some example embodiments. For example, the MCID may be mapped, or associated with, the state or context of a 6LN (for example, an IPv6 address). Moreover, the source (for example, prior or old) 6LBR may have buffered data for the 6LN, and this buffered data may be received from the network after the 6LN disconnects (but before the 6LN connects) to a target (or subsequent or new) 6LBR. When this is the case, the MCID may be associated with the data buffer. As such, when the 6LN reconnects to a target 6LBR, the source 6LBR may forward data in its data buffer to the target 6LBR, which may then forward some of the buffer information (for example, state/context information) to the 6LN.

When the 6LN re-establishes a connection with the same or different 6LBR, the 6LN can, in accordance with some example embodiments, indicate to the 6LN an MCID (such as the MCID being used by the 6LN with a session prior to the disconnection). In some example embodiments, the 6LBR may reply to the indicated MCID; and this reply may, in some example embodiments, indicate that the indicated MCID can still be used by the 6LN on the re-established connection. Alternatively or additionally, the reply may, in some example embodiments, provide a new MCID for use by the 6LN.

When the MCID can still be used, the 6LN and 6LBR may determine that the address registration state is still valid (or available), so the 6LN and 6LBR can continue using the address(es), such as an IPv6 address. However, if the reply provides a new MCID (and/or the 6LN and 6LBR do not agree on MCID), then some, if not all, of the state information may be considered lost (or for example, no longer valid). Moreover, sessions depending on the old state information may be terminated (and/or re-established).

When the 6LN re-establishes an IPv6 connection with a different 6LBR (rather than the first or previously connected 6LBR), the second, different 6LBR may query the first, previous 6LBR about the state information required to indicate successful state transition to the 6LN. This state transfer may occur for example via a centralized server that tracks states/contexts across 6LBRs or via the 6LBR querying other 6LBRs to determine if any other 6LBR can provide the state/context information indicated by the MCID (for example, by sending a multicast request to other 6LBRs in same local area network segment).

To avoid a denial of service (DoS) attack, the 6LN may, in some example embodiments, obey a successful indication of a state/context information transfer only if the 6LN determines that the new 6LBR provides connectivity to the same network that the old 6LBR provided a connection to (for example, the MCID value may be used only if detecting network attachment procedures indicate the network is the same so that new 6LBR is advertising the same IPv6 prefixes as was the old one).

In some example embodiments, the MCID value may comprise a separate value, such as a dedicated value having a sole purpose of indicating context, although the MCID may have other purposes (for example, in the case of an IPv6 address, the MCID has other purposes).

In some example embodiments, the MCID may comprise an IPv6 address, such as the IPv6 addresses defining a local link between the 6LN and the 6LBR.

In some example embodiments, the MCID may comprise a BLE address of a node, such as the 6LN, 6LBR, and/or other node types.

In some example embodiments, the MCID may be a combination (or for example, a hash) of the IPv6 and Bluetooth address of the node, which may allow the 6LBRs to use overlapping MCID values (unique devices and compression contexts are defined through MCID value and IPv6/BLE address pairs). For example, a set of parameters can be combined to form a unique MCID value by concatenating different values or by performing a hash function over selected set of values to form the MCID.

In some example embodiments, the MCID may comprise the Bluetooth Channel Identifier (CID).

In some example embodiments, the MCID may comprise the Bluetooth Channel Identifier (CID) in combination with at least one of the IPv6 or the Bluetooth device address.

In some example embodiments, the MCID may comprise at least one of a short address, a local network address, an identifier, or a combination thereof.

Although reference is made herein the MCID, other types of indicators may be used that enable identifying the address (or context) information to enable session continuity as the node moves and/or re-establishes connections, in accordance with the example embodiments described herein.

Furthermore, although reference is made herein the Bluetooth Low Energy, Bluetooth, IPv6, 6LoWPAN, and the like, other radio technologies and protocols may be used as well.

Figure 2:
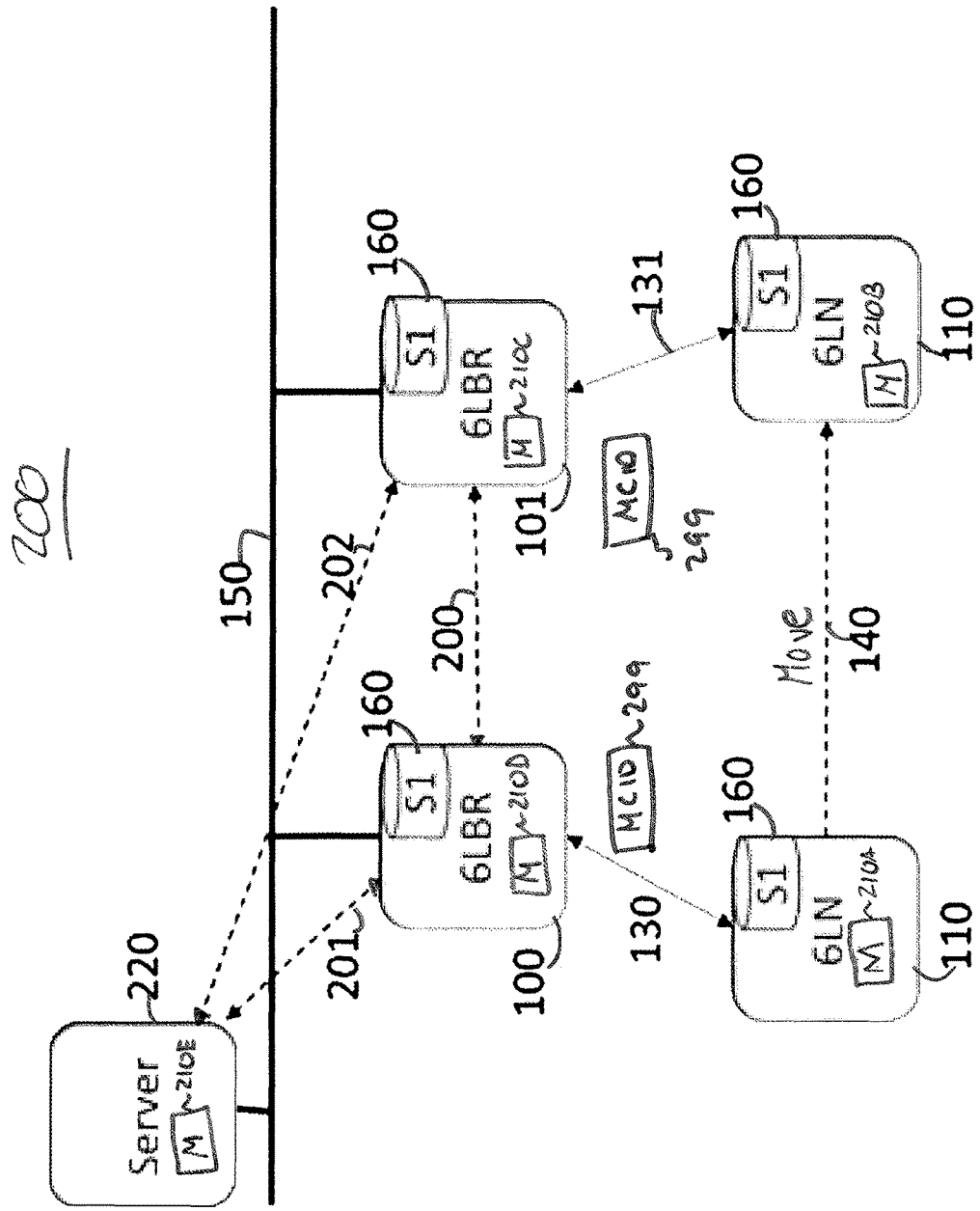
FIG. 2 depicts another example of a system including nodes operating over a low power network, in accordance with some exemplary embodiments.

FIG. 2 depicts an example system 200, in accordance with some example embodiments.

System 200 is similar to system 100 in some respects but system 200 may include MCID processing circuitry 210A-E (labeled "M") to enable handling of the MCID, in accordance with the example embodiments described herein. Moreover, system 200 may include a repository, such as server 220, that can be queried based on the MCID, for the context/state information, in accordance with some example embodiments.

Although FIG. 2 depicts a certain configuration of nodes, other configurations may be used as well. For example, the nodes 101 may be implemented as a 6LowPAN Router (6LR, see, for example, RFC-6775). Moreover, the server 220 may also be implanted at the 6LBR.

System 200 may further include a first node, such as 6LN 110, coupled to another node, such as 6LBR 100. This coupling may be via a low-energy and/or short-range link 130, such as Bluetooth or BLE, although other radio technologies may be used as well. The 6LN 110 and 6LBR 100 may include state information S1 160. However, in accordance with some example embodiments, 6LBR 100 may send an MCID 299 to 6LN 110 via BLE connection 130.

When 6LN 110 moves 140 and the BLE connection 130 is lost, the state 160 may be retained by virtue of the MCID 299 and/or the upper application layers may not need to be alerted about the lost connectivity (at least while the MCID is still valid). In this example, both nodes 100 and 110 may have, or store, the mapping between the MCID and the IPv6 addresses.

When the 6LN 110 re-establishes a BLE connection 131 with another 6LBR such as second 6LBR 101, the 6LN 110 may indicate to 6LBR 101 the MCID 299, in accordance with some example embodiments. Although this example refers to the 6LN 110 sending the MCID 299 as part of connection re-establishment with 6LBR 101, the 6LN 110 may also send MCID 299 to 6LBR 100 if the connection 130 is being re-established as well.

Receipt of the MCID indication may trigger 6LBR 101 to obtain the state S1 160 from for example server 220 and/or 6LBR 100. For example, 6LBR 101 may query 200 6LBR 100 directly by sending the indicated MCID 299 to 6LBR 100. If 6LBR 100 has the state information for MCID 299, 6LBR 100 may response to 6LBR 101 with state information 160. If 6LBR 100 does not have the state information for MCID 299, 6LBR 100 may query 201 server 220, in which case server 220 may respond with the state information S1 to 6LBR 101 (so that it can respond to 6LBR 100) or respond directly at 202 to 6LBR 100. Alternatively or additionally, 6LBR 101 may initially query 202 server 220 to obtain the state information S1 160. Server 220 may maintain state information for one or more 6LBRs and provide, based on the MCID, state information upon request.

The data exchange 200 can occur directly between 6LBRs, or may be assisted by a remote server 220. For example, 6LBR 100 may update the state data by sending at 201 an MCID (including the state information) to server 220, for example, at the moment the connection 130 is disconnected, and the second 6LBR 101 may obtain at 202 the state data from server 220.

When 6LBR 101 receives the state information 160 corresponding to the MCID 299, 6LBR 101 may indicate to 6LN 110 that the state information 160 for MCID 299 can be used. When this is the case, state S1 160 may be used also between 6LN 110 and 6LBR 101. Moreover, IP level and above sessions may remain intact (and thus not disturbed), so IP level and above signaling over 131 may be avoided.

In some example embodiments, the 6LN may send to the 6LBR the MCID 299, which may be carried by for example, an IPv6 Neighbor Solicitation, an IPv6 Router Solicitation, and/or other message types as well.

If an 6LN does not have an MCID (but the 6LN is able to support the MCID), the 6LN may, in accordance with some example embodiments, send to an 6LBR the MCID 299 including a predetermined value, such as zero value (although other predetermined values may be used as well), to signal to the 6LBR that the 6LN desires an MCID.

In some example embodiments, the 6LBR may respond to the 6LN, and the response may be carried by for example an IPv6 Neighbor Advertisement, an IPv6 Router Advertisement message, and/or other message types.

Although the previous example describes the MCID implemented at the IP layer, the MCID may also be implemented at other layers including as part of Bluetooth layer signaling. When the Bluetooth layer is used, the MCID may be included in for example the BLE Credit Based Connection Request message. Moreover, the MCID usage at the Bluetooth layer may operate in so-called "hidden" manner from the IP layers and above, so that the IP layers and above are unaffected (save for not having to tear down the IP layer and above sessions).

FIG. 3 depicts an example format for the MCID format, in accordance with some example embodiments. The MCID may, in accordance with some example embodiments, include one or more of the following: a type 305, a length 310, a result (R) 315, a lifetime 330, an MCID value 340, and a reserved (Res) field 320.

The type 305 may indicate that the packet at 300 is carrying MCID related data. For example, type 305 may be a predetermined value indicating the subsequent bytes relate to, or are about, the MCID as disclosed herein. The length 310 may specify the overall length of the MCID. The result 315 may have predetermined values. For example, a result value of zero during a solicitation message for the MCID may indicate a desire to obtain an MCID. During advertisement, a result of one may advertise that the MCID was successfully maintained by the 6LN after a disconnect, while a result of zero may advertise that the MCID was not successfully retained after the disconnection. The lifetime may be used to indicate (for example, in seconds or other unit of measure) how long the context information may be retained by the 6LBR or server after a disconnection. The MCID value 340 may be a value identifying a particular type of state information or context at a network link, such as an IPv6 address, a BLE address, a Bluetooth Channel Identifier (CID), a short address, a local network address, an identifier, or a combination thereof. The reserved 315 may correspond to a field that is undefined or available for future/other uses.

Figure 4:
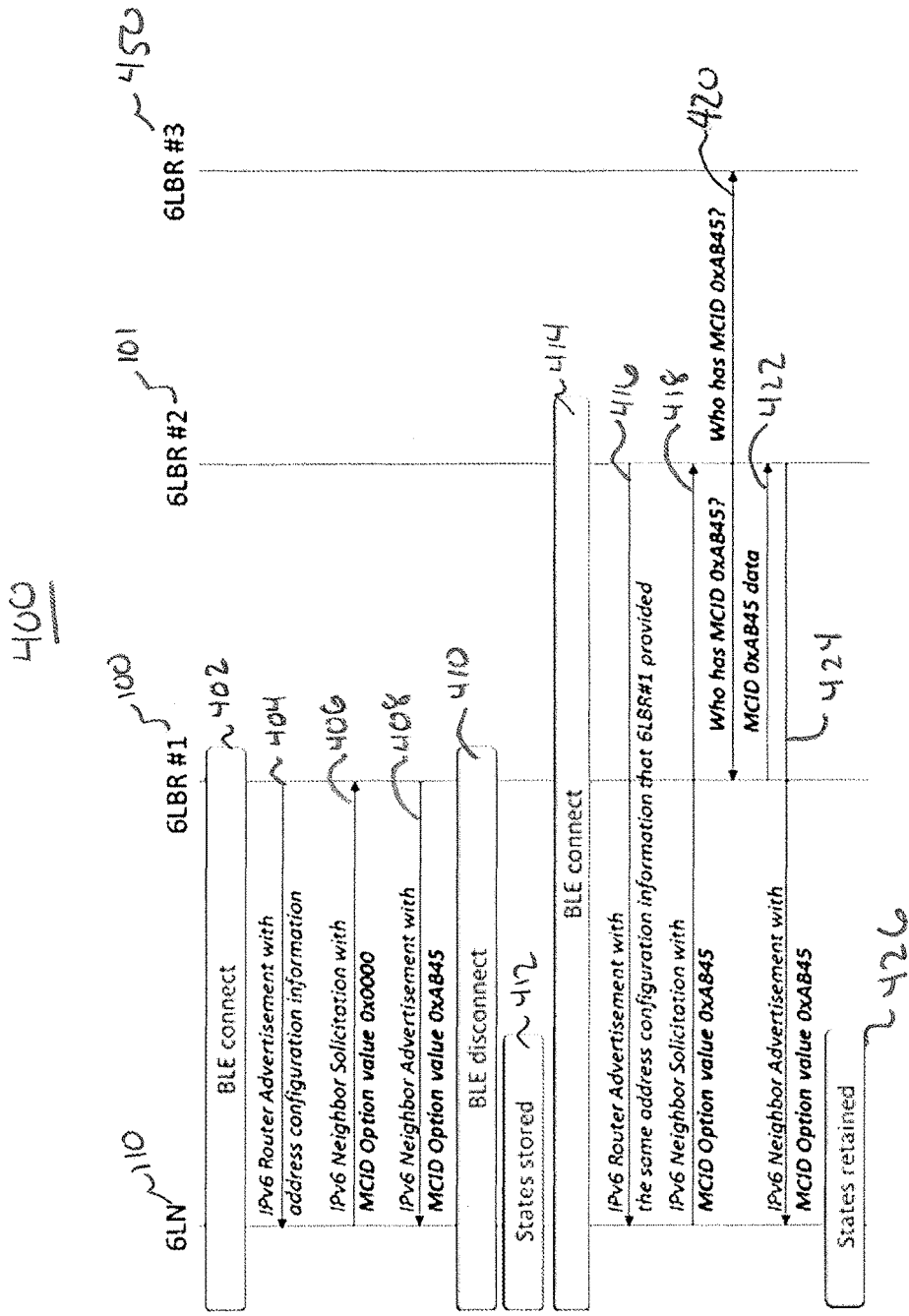
FIG. 4 depicts an example of a process for session continuity using the mobility context identifier in accordance with some exemplary embodiments.

FIG. 4 depicts an example process 400 for enabling mobility in nodes including short-range wireless and/or low power nodes examples of which include Bluetooth nodes, BLE nodes, 6LN, 6LR, 6LBR, and/or other types of nodes as well, in accordance with some example embodiments. The description of FIG. 4 also refers to FIG. 2.

At 402, a node, such as 6LN 110, may be coupled to 6LBR 100 via for example a short-range and/or low-power link such as for BLE link 120. At 404, another node, such as 6LBR 100, may send a message, such as a router advertisement message, an IPv6 router advertisement, and/or the like, and this message may include address configuration information. In response at 406, the 6LN may, in accordance with some example embodiments, send MCID 299. And, MCID 299 may be carried by a message, such as a solicitation message, an IPv6 Neighbor Solicitation message, and/or other types of messages as well. In the example of FIG. 4, the MCID 299 may include a value of 0x0000, which may be a predetermined value that signals the 6LBR 100 that the 6LN desires/requests an MCID value. At 408, 6LBR 100 may respond with an MCID value, such as 0xAB45. The MCID value may be carried by for example a message, such as an IPv6 Neighbor Advertisement message, although other types of messages may be used as well. The MCID value of 0xAB45 may map to a context or state 160 associated with the 6LN 110. This state or context may at least identify addresses assigned to the 6LN 110.

At 410, the 6LN 110 may disconnect from the 6LBR 100, in accordance with some example embodiments. When this is the case, the MCID and/or the mapped state information may at 412 be stored at each of the nodes 100, 110, as well as server 220, in accordance with some example embodiments.

At 414, 6LN 110 may move to another node, router, and/or the like, in accordance with some example embodiments. In the example of FIG. 4, the 6LN moves to 6LBR 101. When this is the case, 6LBR 101 may send a message, such as an advertisement message, an IPv6 router advertisement message, or other type of message, and this message may include address configuration information. This address configuration information may be the same or similar address configuration as what was sent at 404 by 6LBR 100.

At 418, the 6LN 110 may, in accordance with some example embodiments, send MCID 299 (which may be in response to message 416). This MCID 299 may be carried by a message, such as a solicitation message, an IPv6 Neighbor Solicitation message, or other type of message. The MCID may correspond to the MCID provided at 408, which in this example equals 0xAB45. If however, the MCID provided at 408 is no longer valid, another MCID may be provided.

When 6LBR 101 receives the message 418 that includes the MCID, the 6LBR 101 may, in accordance with some example embodiments, determine the corresponding state information. To determine the corresponding state, the 6LBR 101 may (if it already does not have the information) query other nodes, such as 6LBR 101 and 450 and/or sever 220. At 422, 6LBR 100 may respond with a message that includes MCID 299 and/or the state information, such the IPv6 address which was used by the 6LN before being disconnected 410.

At 424, the 6LBR 101 may respond with a message including the MCID and/or the state information 160, in accordance with some example embodiments. The 6LN 110 may then store the received information and then operate using the received state, such as the IPv6 address which was used by the 6LN before being disconnected 410. In this way, the MCID enables the 6LN to retain the sessions it had prior to the disconnection.

As noted above, the state/context information may be identified by the MCID value mapped to IPv6 link-local address(es). When this is the case, the 6LBR 100 may store the state such as the link-local addresses mapped to the MCID value, and the 6LBRs may also store the state such as the link-local addresses of the 6LN nodes, when exchanging state/contact information.

In some example embodiments, the MCID may be generated and used in a hidden mode, as noted above, from the IP layer. When that is the case, entities may follow a similar process as in FIG. 4 but the 6LBRs may need to hide the MCID from the IP layer that a 6LN node has changed 6LBR. This may be implemented by, for example, modifying Bluetooth LE layer protocols for message exchanges between 6LN and 6LBR, and using, for example, the same protocol for communications between 6LBRs. The MCID values may be exchanged during L2CAP Connection Oriented Channel setup alongside a maximum transmission unit (MTU) negotiation, and information passed to IP layer alongside MTU value.

In some example embodiments, the state information exchanges between nodes may include additional information (for example, other state than the address registration state). This additional information may include firewall parameters, application level proxy parameters, BLE transmission credits, network authentication data, routing data, and/or the like.

In some example embodiments, the nodes may be configured to operate using IPv6 and low power, short-range IP-based network technologies operative with for example the Internet of Things (IoT). These low power networks may include for example Bluetooth low energy, IEEE 802.15.4, and/or other low power networks.

Figure 5:
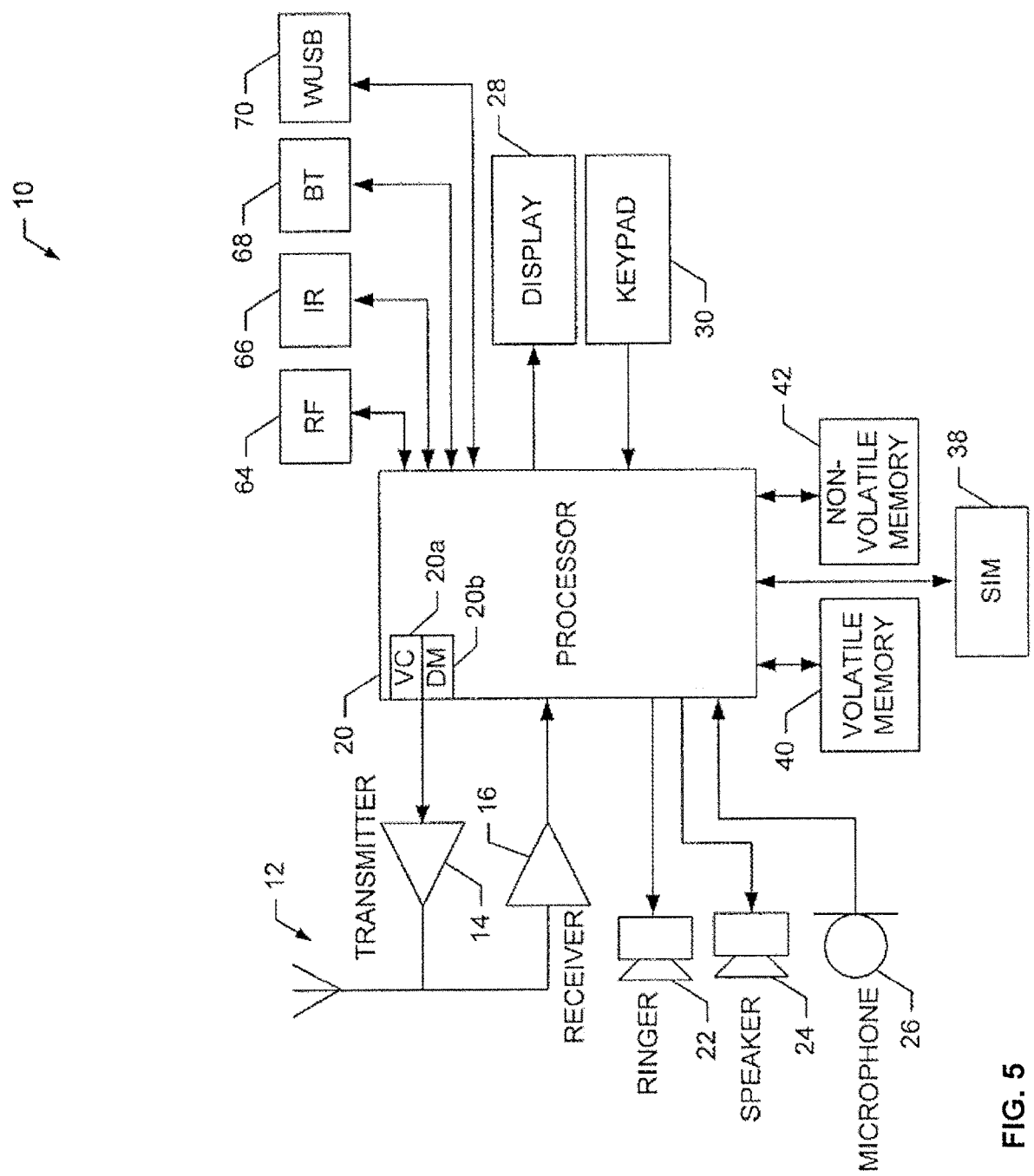
FIG. 5 depicts an example of an apparatus, in accordance with some exemplary embodiments.

FIG. 5 illustrates a block diagram of an apparatus 10, in accordance with some example embodiments. The apparatus 10 (or portions thereof) may be implemented at nodes 110, 100, 101, and/or the like.

In the case of IoT and/or other low power nodes, the apparatus may, in some example embodiments, include limited processing at 20, limited memory at 40, 42, and 37, and power capabilities (when compared to for example a smartphone). Moreover, one or more of the user interface related components (described further below), such as keypad 30, display 28, ringer 22, speaker 24, and/or microphone 26 may not be implemented at apparatus 10. Likewise, the radio aspects may be configured for low power operation using for example BLE, Bluetooth, IEEE 802.15.4, and/or the like. Moreover, the apparatus may only include this low power radio, rather than higher power cellular radios.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, Constrained Application Protocol (CoAP), and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWPAN, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as process 400 and/or any other operations/functions disclosed herein (for example, sending, by a low power node, an indicator to a target low power border router, wherein the indicator at least represents a request to operate with a prior context used at a source low power border router; and receiving, by the low power node, a message in response to the indicator, wherein the message at least indicate whether the low power node can continue to operate at the target low power border router with a same context used at the source low power border router). The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to process 400 as well as other session continuity operations disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is maintaining connection setup and session information in low power network devices.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
sending, by a low power node and to a target low power router, an indicator, wherein the low power node comprises an internet protocol version six over Bluetooth low energy node, wherein the indicator at least represents a request to operate with a first context used at a source low power router, wherein the first context comprises at least one of a Bluetooth channel identifier or a Bluetooth low energy address of a link used by the low power node when connected to the source low power router, and wherein the indicator causes the target low power router to request the first context used at the source low power router; and
receiving, by the low power node and from the target low power router, a message in response to the indicator, wherein the message at least indicates the low power node can operate at the target low power router with a second context that corresponds to the first context used previously at the source low power router, wherein the first context and the second context are the same, and wherein the message, which indicates that the low power node can operate at the target low power router with the second context, is received in response to the target low power router receiving, from the source low power router, the first context used at the source low power router.

2. The method of claim 1 further comprising:
establishing, by the low power node, a connection using the second context to the target low power router.

3. The method of claim 1 further comprising:
establishing, by the low power node, a connection using a different context to the target low power router, when the message indicates the first context cannot be used.

4. The method of claim 1, wherein the second context comprises a short address, a local network address, an identifier, a hash value, or a combination thereof.

5. The method of claim 1, wherein the second context comprises an internet protocol version six address of a link used by the low power node when connected to the source low power router.

6. The method of claim 1, wherein the second context comprises at least one of the Bluetooth channel identifier or the Bluetooth low energy address of a link used by the low power node when connected to the source low power router.

7. The method of claim 1, wherein the low power node, the target low power router, and the source low power router are configured to at least operate in accordance with an internet protocol version six address and Bluetooth low energy.

8. The method of claim 1, wherein the low power node comprises an internet protocol version six address low power wireless personal area network node.

9. The method of claim 1, wherein the target low power router and the source low power router each comprise at least one of an internet protocol version six address border router or an internet protocol version six address router.

10. An apparatus, comprising:
at least one processor; and
at least one memory including computer program code, the at least one memory and the computer program code configured to, with the at least one processor, cause the apparatus to at least:
send, to a target low power router, an indicator, wherein the apparatus comprises an internet protocol version six over Bluetooth low energy node, wherein the indicator at least represents a request to operate with a first context used at a source low power router, wherein the first context comprises at least one of a Bluetooth channel identifier or a Bluetooth low energy address of a link used by the apparatus when connected to the source low power router, and wherein the indicator causes the target low power router to request the first context used at the source low power router; and
receive, by the apparatus and from the target low power router, a message in response to the indicator, wherein the message at least indicates the apparatus can operate at the target low power router with a second context that corresponds to the first context used previously at the source low power router, wherein the first context and the second context are the same, and wherein the message, which indicates that the apparatus can operate at the target low power router with the second context, is received in response to the target low power router receiving, from the source low power router, the first context used at the source low power router.

11. The apparatus of claim 10, wherein the at least one memory and the computer program code are further configured to, with the at least one processor, cause the apparatus to at least establish a connection using the second context to the target low power router.

12. The apparatus of claim 10, wherein the at least one memory and the computer program code are further configured to, with the at least one processor, cause the apparatus to at least establish a connection using a different context to the target low power router, when the message indicates the first context cannot be used.

13. The apparatus of claim 10, wherein the second context comprises a short address, a local network address, an identifier, a hash value, or a combination thereof.

14. The apparatus of claim 10, wherein the second context comprises an internet protocol version six address of a link used by the apparatus when connected to the source low power router.

15. The apparatus of claim 10, wherein the second context comprises at least one of the Bluetooth channel identifier or the Bluetooth low energy address of a link used by the apparatus when connected to the source low power router.

16. The apparatus of claim 10, wherein the apparatus, the target low power router, and the source low power router are configured to at least operate in accordance with an internet protocol version six address and Bluetooth low energy.

17. The apparatus of claim 10, wherein the apparatus comprises at least one of a low power node or an internet protocol version six address low power wireless personal area network node.

18. The apparatus of claim 10, wherein the target low power router and the source low power router each comprise at least one of an internet protocol version six address border router or an internet protocol version six address router.

* * * * *